US012645574B2

(12) United States Patent
Singh et al.

(10) Patent No.: US 12,645,574 B2
(45) Date of Patent: Jun. 2, 2026

(54) INTELLIGENT METHOD LEVERAGING TANGLE TECHNOLOGY FOR VALIDATING APPLICATION PROGRAMMING INTERFACES

(71) Applicant: Bank of America Corporation, Charlotte, NC (US)

(72) Inventors: Shailendra Singh, Maharashtra (IN); Chetan Singh Naruka, Haryana (IN); Vinod Maghnani, Haryana (IN)

(73) Assignee: Bank of America Corporation, Charlotte, NC (US)

( * ) Notice: Subject to any disclaimer, the term of this patent is extended or adjusted under 35 U.S.C. 154(b) by 296 days.

(21) Appl. No.: 18/581,900

(22) Filed: Feb. 20, 2024

(65) Prior Publication Data

US 2025/0265176 A1     Aug. 21, 2025

(51) Int. Cl.
*G06F 11/3668* (2025.01)
*G06F 8/20* (2018.01)
*G06F 11/3698* (2025.01)

(52) U.S. Cl.
CPC ............ *G06F 11/3688* (2013.01); *G06F 8/20* (2013.01); *G06F 11/3698* (2025.01)

(58) Field of Classification Search
CPC ..... G06F 8/20; G06F 11/3688; G06F 11/3698
USPC .................................. 717/104–109, 124–126
See application file for complete search history.

(56) References Cited

U.S. PATENT DOCUMENTS 7,464,366 B2   12/2008   Shukla et al.
8,903,711 B2   12/2014   Lundberg et al.

| | | | |
|---|---|---|---|
| 10,705,942 B1 * | 7/2020 | Jha ...................... | G06F 11/3684 |
| 10,805,175 B2 | 10/2020 | Stöcker | |
| 11,003,764 B2 | 5/2021 | Shukla et al. | |
| 11,184,188 B2 | 11/2021 | Ansari et al. | |
| 11,334,348 B2 * | 5/2022 | Vyas ........................ | G06F 8/71 |
| 11,336,455 B2 | 5/2022 | Ford | |
| 11,671,256 B2 | 6/2023 | Simons | |

(Continued)

FOREIGN PATENT DOCUMENTS

AU     2019200821 B2     3/2020
WO     2024010802 A1     1/2024

OTHER PUBLICATIONS

Nguyen et al., "Exploring API Embedding for API Usages and Applications", 2017, IEEE, pp. 438-449. (Year: 2017).*

(Continued)

*Primary Examiner* — Ted T. Vo

(74) *Attorney, Agent, or Firm* — Banner & Witcoff, Ltd.

(57)     ABSTRACT

Arrangements for developing an application programming interface (API) are provided. A computing platform may train an artificial intelligence (AI) engine. The computing platform may receive a request to develop a new API. The computing may extract features of the new API. The computing platform may generate one or more similarity scores based on similarities between the extracted features of the new API and corresponding similar historical API features. The computing platform may output the new API based on solving a correlation matrix. The computing platform may test the API and output a validation score. The computing platform may deploy the API based on the validation score being equal to or exceeding a threshold.

20 Claims, 13 Drawing Sheets

(56) References Cited

U.S. PATENT DOCUMENTS

| | | | |
|---|---|---|---|
| 11,734,153 B2 * | 8/2023 | O'Dell | G06F 11/3495 |
| | | | 719/328 |
| 11,822,438 B1 * | 11/2023 | Arora | G06F 11/0754 |
| 12,038,824 B2 * | 7/2024 | Mangat | G06N 3/0464 |
| 2018/0343120 A1 | 11/2018 | Andrade | |
| 2021/0350357 A1 | 11/2021 | Lafontaine | |
| 2022/0078601 A1 | 3/2022 | Poornachandran et al. | |
| 2022/0182221 A1 | 6/2022 | Wood et al. | |
| 2022/0261804 A1 | 8/2022 | Concannon et al. | |
| 2023/0275759 A1 | 8/2023 | Majumdar | |
| 2023/0360042 A1 | 11/2023 | Doney et al. | |
| 2023/0393832 A1 | 12/2023 | Touati et al. | |
| 2024/0005409 A1 | 1/2024 | Doney | |
| 2024/0007329 A1 | 1/2024 | Doney et al. | |
| 2024/0007479 A1 | 1/2024 | Doney | |

OTHER PUBLICATIONS

Hussain et al., "Command Similarity Measurement Using NLP", 2021, SLATE, Symposium on Languages, Applications and Technologies, 14 pages. (Year: 2021).*
Ouyang et al., "LLM is Like a Box of Chocolates: the Non-determinism of ChatGPT in Code Generation", 2023, arXiv, 12 pages. (Year: 2023).*

\* cited by examiner

105

114

115

116

API Validation Server System

Processor(s)

Memory(s)

API Validation Module
115a

API Validation Database
115b

Artificial Intelligence (AI) Engine
115c

Communication Interface(s)

API Validation Server System 105

User Device 104

230) Receive Notification

Enterprise Server System 103

API Development Platform 102

229) Send Notification To 104

231) Update AI Engine

Figure 4:
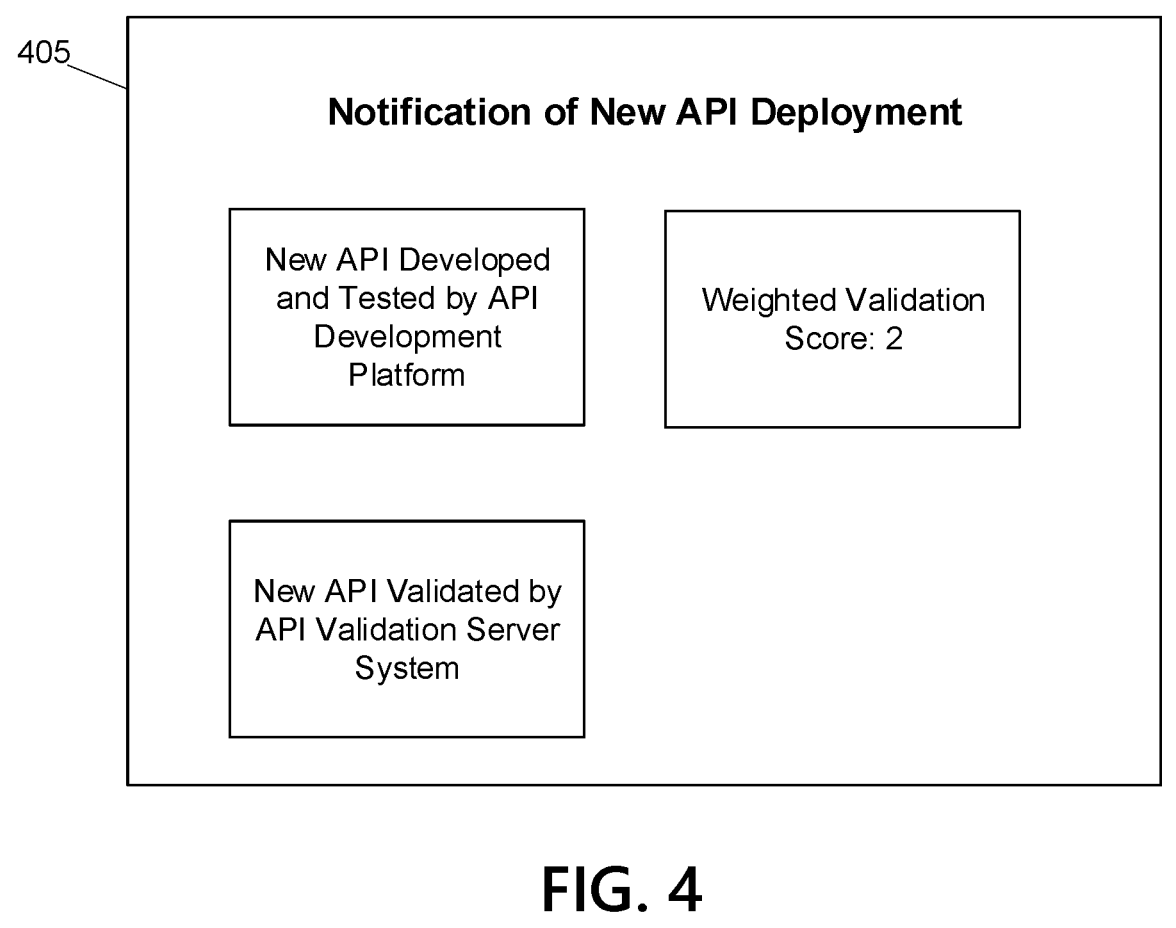

405

Notification of New API Deployment

New API Developed and Tested by API Development Platform

Weighted Validation Score: 2

New API Validated by API Validation Server System

Correlation Matrix

|  | Historical Feature A | Historical Feature B | Historical Feature C |
|---|---|---|---|
| New Feature 1 | 1 | 0.4 | 0.3 |
| New Feature 2 | 0.2 | 0.6 | 0.9 |
| New Feature 3 | 0.3 | 0.9 | 0.3 |

FIG. 5

INTELLIGENT METHOD LEVERAGING TANGLE TECHNOLOGY FOR VALIDATING APPLICATION PROGRAMMING INTERFACES

BACKGROUND

Aspects of the disclosure relate to developing an application programming interface (API). An API may refer to a combined set of features that together, may allow software programs to communicate with each other. An API feature may refer to, for example, an authentication protocol, a security protocol, a response time, and/or the like. Currently, the development, testing, and/or validation of an API may require significant time and computing resources to accomplish, and may further be prone to errors. Accordingly, it may be advantageous to identify more effective and efficient methods to develop, test, and validate an API.

SUMMARY

Aspects of the disclosure provide effective, efficient, scalable, and convenient solutions that address and overcome the technical problems associated with the development, test, and validation of an API. In accordance with one or more aspects of the disclosure, a computing platform with at least one processor, a communication interface communicatively coupled to the at least one processor, and memory storing computer-readable instructions may train, based on historical data, an artificial intelligence (AI) engine, in which training the AI engine may configure the AI engine to extract one or more features from a request to develop a new application programming interface (API). The training may further configure the AI engine to generate one or more similarity scores, in which the one or more similarity scores may be based on similarities between the one or more features of the new API and one or more corresponding features of historical APIs. The training may further configure the AI engine to output the new API based on solving a correlation matrix, in which the correlation matrix may output the one or more similarity scores, the one or more features of the new API, and the one or more corresponding features of the historical APIs. The computing platform may receive, from a user device, a request to develop a first API. The computing platform may extract, using the AI engine, one or more features of the first API. The computing platform may generate, by inputting the one or more features of the first API into the AI engine, one or more first similarity scores, in which the one or more first similarity scores may indicate a numerical similarity between the one or more features of the first API and the one or more corresponding features of historical APIs. The computing platform may output the first API based on solving a first correlation matrix, in which solving the first correlation matrix may be based on the one or more features of the first API, the one or more corresponding features of historical APIs, and the one or more first similarity scores. The computing platform may execute a first test of the first API. The computing platform may output a validation score based on the executing. The computing platform may send the first API to one or more validation servers, in which each of the validation servers may be configured to execute one or more tests of the first API. The computing platform may weight the validation score based on the one or more tests executed by the one or more validation servers. The computing platform may deploy the first API based on the weighted validation score being equal to or exceeding a threshold.

In some instances, the computing platform may send, to the user device, a notification indicating that the first API was deployed and one or more commands directing the user device to display the notification, which may cause the user device to display the notification. In one or more examples, the computing platform may identify one or more historical test errors of the one or more corresponding features of the historical APIs. The computing platform may identify one or more corresponding policies to remediate the one or more historical test errors. The computing platform may apply the one or more corresponding policies to proactively eliminate potential future errors associated with the executing the first test.

In some instances, the solving the correlation matrix may further include iterating through the one or more corresponding features of the historical APIs to identify a highest similarity score for each one of the one or more features of the new API. In one or more examples, the outputting the validation score may be based on successfully executing the first test and may be a numerical value that may correspond to a number of successful tests by the one or more validation servers.

In some instances, the training the AI engine may further configure the AI engine to receive one or more historical APIs, one or more historical tests, one or more historical policies, or one or more historical weighted validation scores. In one or more examples, the API may be deployed at an enterprise server associated with the computing platform. In some instances, the API may be deployed to the user device.

In one or more examples, the computing platform and the one or more validation servers may form a directed acyclic graph network. In some instances, the computing platform may update, using a dynamic feedback loop and based on the first API, the executing the first test, and the weighted validation score, the AI engine.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 4 depicts an illustrative graphical user interface for implementing an intelligent method for efficient API development validation for a distributed programming environment leveraging tangle technology in accordance with one or more example embodiments; and FIG. 5 depicts an illustrative correlation matrix for implementing an intelligent method for efficient API development validation for a distributed programming environment lever-aging tangle technology in accordance with one or more example embodiments.

DETAILED DESCRIPTION

Figure 1A:
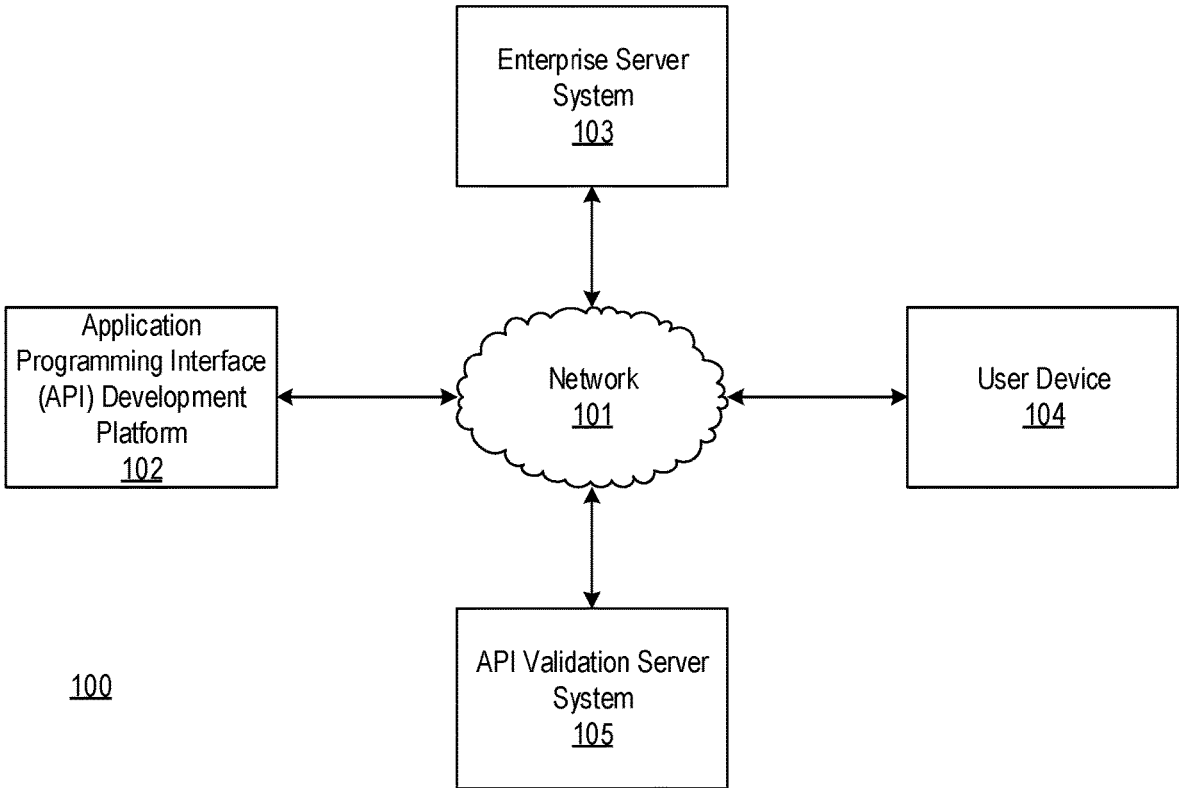
FIGS. 1A-1C depict an illustrative computing environment for implementing an intelligent method for efficient API development validation for a distributed programming environment leveraging tangle technology in accordance with one or more example embodiments.

In the following description of various illustrative embodiments, reference is made to the accompanying draw-ings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the speci-fication is not intended to be limiting in this respect.

As a brief introduction to the concepts described further herein, one or more aspects of the disclosure relate to the efficient development, test, and/or validation of an applica-tion programming interface (API). The lifestyle of an API may usually be driven by an API developer and/or provider (who may be responding to requests to develop a new API). APIs may exist in various versions and software lifecycle states within a system landscape and may frequently be developed by API developers, which, in some instances, may use an integrated development environment (IDE). After a successful test within an IDE, a particular API may usually be tested in a test and/or quality landscape for further tests (e.g., integration tests) and/or validation. After success-ful testing/validation, the API may be deployed in a pro-ductive landscape. These states (e.g., development version, test/quality version, and productive version) may typically be managed by the API provider.

Accordingly, described herein is a tangle-powered API development system that may automatically generate a requested API. The system may consider the features of the new API and may match it to features of existing APIs and corresponding test reviews of the existing APIs. The API development system may use this correlation and a test generator to validate the new API. Accordingly, described herein is a technical procedure and apparatus for an API validation for distributed programming environment lever-aging tangle technology. The method may enable develop-ment operations (DevOps) server machine-to-machine API validation and orchestration using a tangle decentralized network node of DevOps infrastructure. The method may be a generative artificial intelligence (AI) engine-based solu-tion for development and/or test teams to validate their APIs before releasing without spending time and money on exten-sive API test results. Accordingly, a consensus algorithm may be leveraged to achieve agreement one or more data values among distributed processes or systems. The consen-sus algorithm may be designed to achieve reliability in the API management system involving multiple sources for API testing and/or validating.

Accordingly, the tangle consensus may be used for vali-dating authorized API test reviews within the distributed authentication system and/or validating new blocks within the distributed review system. The method may consist of API feature validation scoring procedure that may analyze existing API features and/or dependencies and may take many feature combinations to find dependencies, which may help to find partial correlations of each of the API features. An AI model may be used to generate multiple permutations for each context/step to augment the training dataset. Inter-nally the model may use a reward model on each step which, in some instances, may be repeated with an increasing filtering threshold to fine-tuned on the filtered dataset on human preferences as the scoring function. This may be a model to examine historical API data to identify patterns and inform a development team in real-time by training on large datasets before launch. The reduction of errors may finally be made possible by this proactive approach, which may permit prompt interventions and focused solutions, and may prevent failure. The method may use an AI algorithm to produce exact instructions for applying solutions by com-bining data from several sources, including historical data.

Figure 1B:
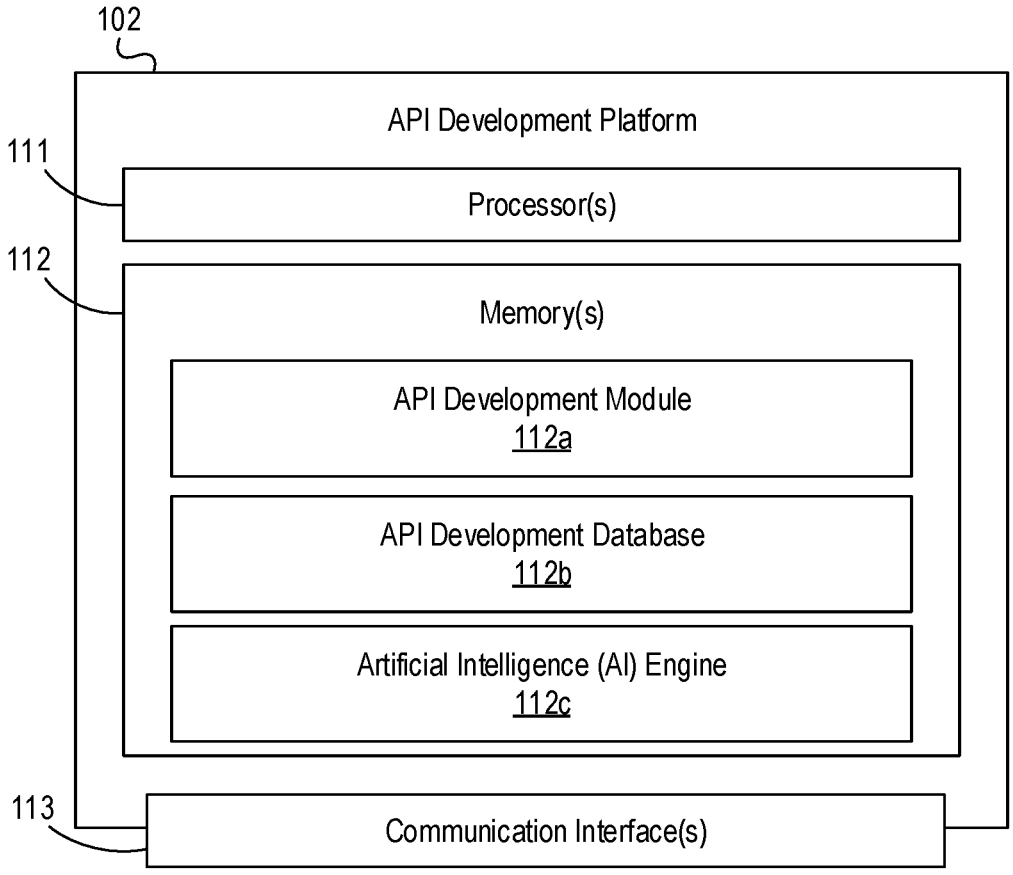
Figure 1C:
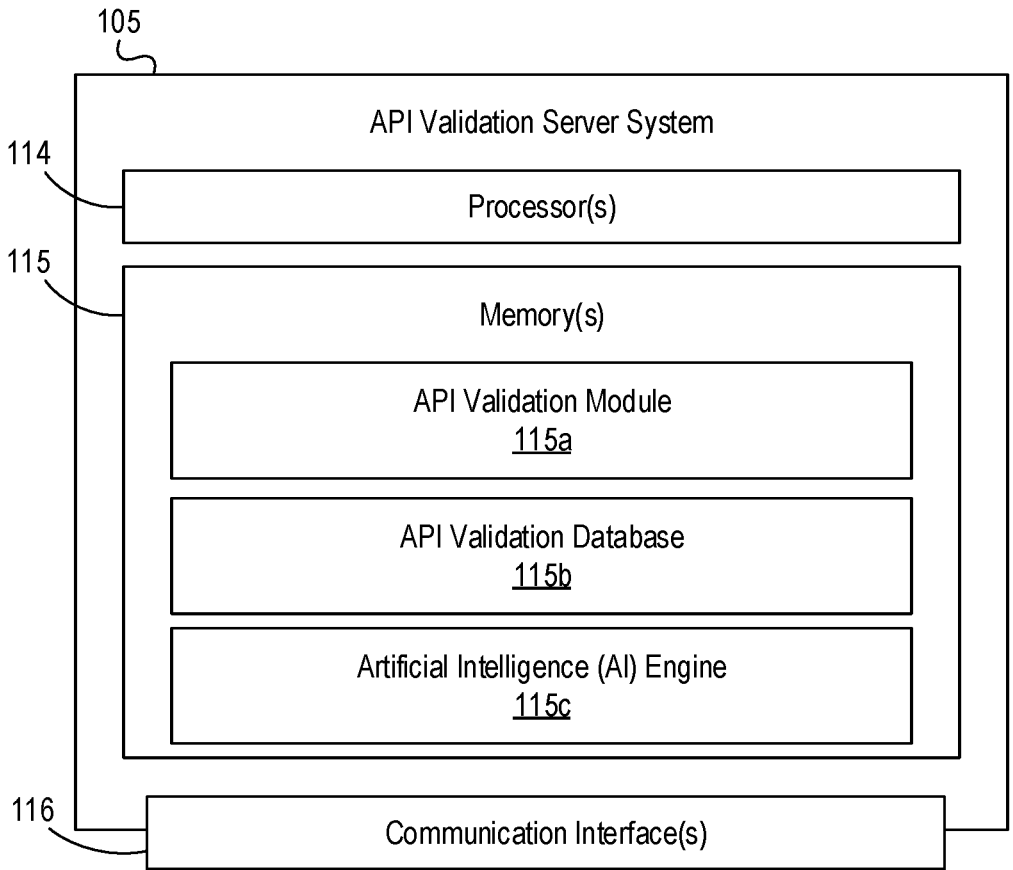

FIGS. 1A-1C depict an illustrative computing environ-ment for implementing an intelligent method for efficient API development validation for a distributed programming environment leveraging tangle technology in accordance with one or more example embodiments. Referring to FIG. 1A, computing environment 100 may include one or more computer systems. For example, computing environment 100 may include an application programming interface (API) development platform 102, an enterprise server sys-tem 103, a user device 104, and an API validation server system 105.

As described further below, API development platform 102 may be a computer system that includes one or more computing devices (e.g., servers, server blades, or the like) and/or other computer components (e.g., processors, memo-ries, communication interfaces) that may be used to train, host, and/or otherwise refine an artificial intelligence (AI) engine, which may be used to automatically develop, test, and/or validate a new API based on a request to develop the new API from user device 104.

Enterprise server system 103 may include one or more computing devices and/or other computer components (e.g., processors, memories, communication interfaces). In some instances, enterprise server system 103 may include one or more data sources that may store historical data, which may be used to train an AI engine to automatically develop, test, and validate a new API based on a request from user device 104. In some instances, enterprise server system 103 may be configured as a cloud storage system, in which enterprise server system 103 may be a cloud computing model that stores data on the Internet through a cloud computing provider who manages and operates enterprise server system 103 as a service. In some instances, enterprise server system 103 may be local or non-cloud based storage, or may support cloud based storage.

User device 104 may be a laptop computer, desktop computer, mobile device, tablet, smartphone, and/or other device, which may send a request to API development platform 102 to develop a new API. In some instances, user device 104 may be a user computing device that is used by an individual (e.g., a developer). In some instances, user device 104 may be an enterprise computing device that is used by an administrator to request that an API be devel-oped. In some instances, user device 104 may be configured to display one or more user interfaces (e.g., interfaces depicting a notification that a new API has been developed, tested, validation, and/or deployed, or the like). Although only a single user device 104 is depicted, this is for illus-trative purposes only, and any number of user devices may be implemented in the environment 100 without departing from the scope of the disclosure.

API development validation server system 105 may be a computer system that includes one or more computing devices (e.g., servers, server blades, or the like) and/or other computer components (e.g., processors, memories, communication interfaces) that may be used to test and/or validate a new API that was previously developed by API development platform 102. In doing so, the new API may be validated by a system in addition to API development platform 102, which may establish a tangle-based consensus of the validity of the new API. Although only one API validation server system 105 is shown, there may be more equivalent systems to further validate a new API without departing from the scope of the disclosure.

Computing environment 100 also may include one or more networks, which may interconnect API development platform 102, enterprise server system 103, user device 104, and API validation server system 105. For example, computing environment 100 may include a network 101 (which may interconnect, e.g., API development platform 102, enterprise server system 103, user device 104, and API validation server system 105, and/or other computing devices).

In one or more arrangements, API development platform 102, enterprise server system 103, user device 104, and/or API validation system 105 may be any type of computing device capable of sending and/or receiving requests and processing the requests accordingly. For example, API development platform 102, enterprise server system 103, user device 104, API validation server system 105, and/or the other systems included in computing environment 100 may, in some instances, be and/or include servers, such as an enterprise server, server computers, desktop computers, laptop computers, tablet computers, smart phones, or the like that may include one or more processors, memories, communication interfaces, storage devices, and/or other components. In some instances, API development platform 102 may support a multi-cloud infrastructure. As noted above, and as illustrated in greater detail below, any and/or all of API development platform 102, enterprise server system 103, user device 104, and API validation server system 105 may, in some instances, be special-purpose computing devices configured to perform specific functions.

Referring to FIG. 1B, API development platform 102 may include one or more processors 111, memory 112, and communication interface 113. A data bus may interconnect processor 111, memory 112, and communication interface 113. Communication interface 113 may be a network interface configured to support communication between API development platform 102 and one or more networks (e.g., network 101, or the like). Memory 112 may include one or more program modules having instructions that when executed by processor 111 cause API development platform 102 to perform one or more functions described herein and/or one or more databases that may store and/or otherwise maintain information which may be used by such program modules and/or processor 111. In some instances, the one or more program modules and/or databases may be stored by and/or maintained in different memory units of API development platform 102 and/or by different computing devices that may form and/or otherwise make up API development platform 102. For example, memory 112 may have, host, store, and/or include API development module 112a, API development database 112b, and/or artificial intelligence (AI) engine 112c.

API development module 112a may have instructions that direct and/or cause API development platform 102 to process and/or execute a request to automatically develop, test, validate, and/or deploy a new API, and/or perform other functions, as discussed in greater detail below. API development database 112b may store information used by API development module 112a and/or API development platform 102 and/or in performing other functions. AI engine 112c may be used by API development platform 102 and/or API development module 112a to automatically develop, test, and/or validate a new API, and/or perform other methods described herein.

Referring to FIG. 1C, API validation server system 105 may include one or more processors 114, memory 115, and communication interface 116. A data bus may interconnect processor 114, memory 115, and communication interface 116. Communication interface 116 may be a network interface configured to support communication between API validation server system 105 and one or more networks (e.g., network 101, or the like). Memory 115 may include one or more program modules having instructions that when executed by processor 114 cause API validation server system 105 to perform one or more functions described herein and/or one or more databases that may store and/or otherwise maintain information which may be used by such program modules and/or processor 114. In some instances, the one or more program modules and/or databases may be stored by and/or maintained in different memory units of API validation server system 105 and/or by different computing devices that may form and/or otherwise make up API validation server system 105. For example, memory 115 may have, host, store, and/or include API validation module 115a, API validation database 115b, and/or artificial intelligence (AI) engine 115c.

API validation module 115a may have instructions that direct and/or cause API validation server system 105 to process and/or execute a request to test and/or validate a new API from API development platform 102, and/or perform other functions, as discussed in greater detail below. API validation database 115b may store information used by API validation module 115a and/or API validation server system 105 and/or in performing other functions. AI engine 115c may be used by API validation platform 105 and/or API validation module 115a to validate a new API and/or develop its own API based on a different request from user device 104 to develop a different API, and/or perform other methods described herein.

Figure 2A:
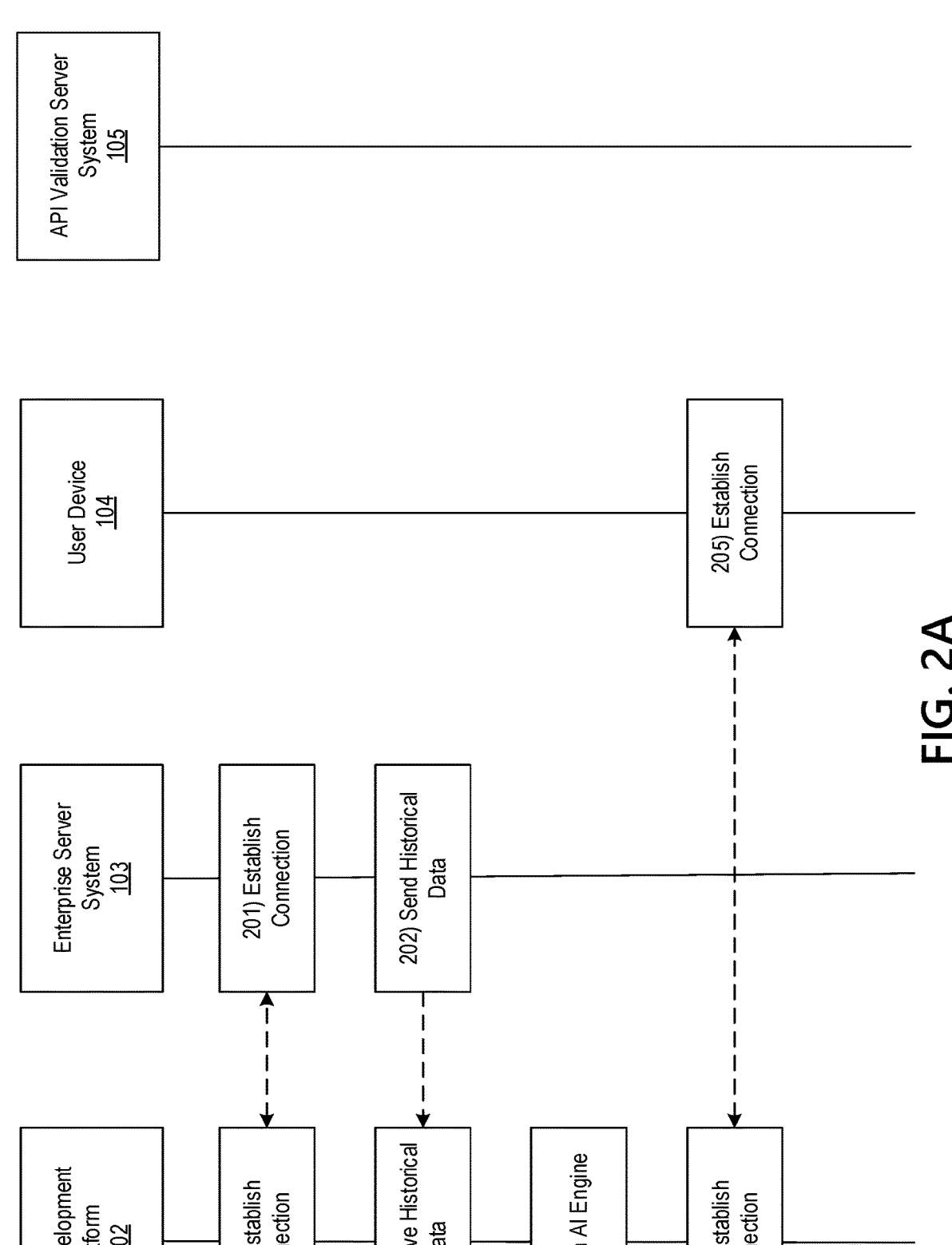
FIGS. 2A-2G depict an illustrative event sequence for implementing an intelligent method for efficient API development validation for a distributed programming environment leveraging tangle technology in accordance with one or more example embodiments.

FIGS. 2A-2G depict an illustrative event sequence for implementing an intelligent method for efficient API development validation for a distributed programming environment leveraging tangle technology in accordance with one or more example embodiments. Referring to FIG. 2A, at step 201, enterprise server system 103 may establish a connection with API development platform 102. For example, enterprise server system 103 may establish a first wireless data connection with API development platform 102 to link user device 104 to API development platform 102 (e.g., in preparation for sending a request to develop an API, and/or performing other functions). In some instances, enterprise server system 103 may identify whether or not a connection is established with API development platform 102. If a connection is already established with API development platform 102, enterprise server system 103 might not re-establish the connection. If a connection is not yet established API development platform 102, enterprise server system 103 may establish the first wireless data connection as described herein.

At step 202, enterprise server system 103 may send historical data to API development platform 102. At step 203, API development platform 102 may receive the historical data. In some instances, API development platform 102 may receive the historical data while the first wireless data connection is established. In receiving the historical data, API development platform 102 may receive information such as historical APIs (which may include, e.g., historical API features), historical tests that were previously performed to validate the historical APIs, historical policies that were used to remediate errors based on historical tests that were previously performed on historical APIs, historical weighted validation scores, and/or other types of data.

At step 204, API development platform 102 may train an artificial intelligence (AI) engine based on the historical data. In some instances, the AI engine may utilize generative AI, which is a sub-type of AI models that may learn patterns related to input training data and may subsequently generate new data that may have similar characteristics. In training the AI engine, API development platform 102 may configure the AI engine to extract features of a new API that has been requested to be developed, compare the features of the new API to features of historical APIs, identify historical API features that are similar to the new API features, identify and/or apply polices that were used to remediate errors based on previous tests of the historical API features, generate a correlation matrix based on scoring the previous historical APIs, output a new API based on solving the correlation matrix, and/or perform other functions.

In some instances, the AI engine may utilize supervised learning, in which labeled data sets may be inputted into the AI engine (e.g., historical APIs/historical API features, corresponding similarity scores, and the like), which may be used to classify information and accurately predict outcomes with respect API testing and/or validating. Using labeled inputs and outputs, the AI engine may measure its accuracy and learn over time. For example, supervised learning techniques such as linear regression, classification, neural networking, and/or other supervised learning techniques may be used.

Additionally or alternatively, the AI engine may utilize unsupervised learning, in which unlabeled data may be input into the AI engine. For example, unsupervised learning techniques such as k-means, gaussian mixture models, frequent pattern growth, and/or other unsupervised learning techniques may be used. In some instances, the AI engine may be a combination of supervised and unsupervised learning. In doing so, API development platform 102 may dynamically and continuously update and/or otherwise refine the AI engine so as to increase accuracy of the AI engine over time.

At step 205, user device 104 may establish a connection with API development platform 102. For example, user device 104 may establish a second wireless data connection with API development platform 102 to link user device 104 to API development platform 102 (e.g., in preparation for sending a request to develop a new API, and/or performing other functions). In some instances, user device 104 may identify whether or not a connection is established with API development platform 102. If a connection is already established with distributed API development platform 102, user device 104 might not re-establish the connection. If a connection is not yet established with API development platform 102, user device 104 may establish the second wireless data connection as described herein.

Figure 2B:
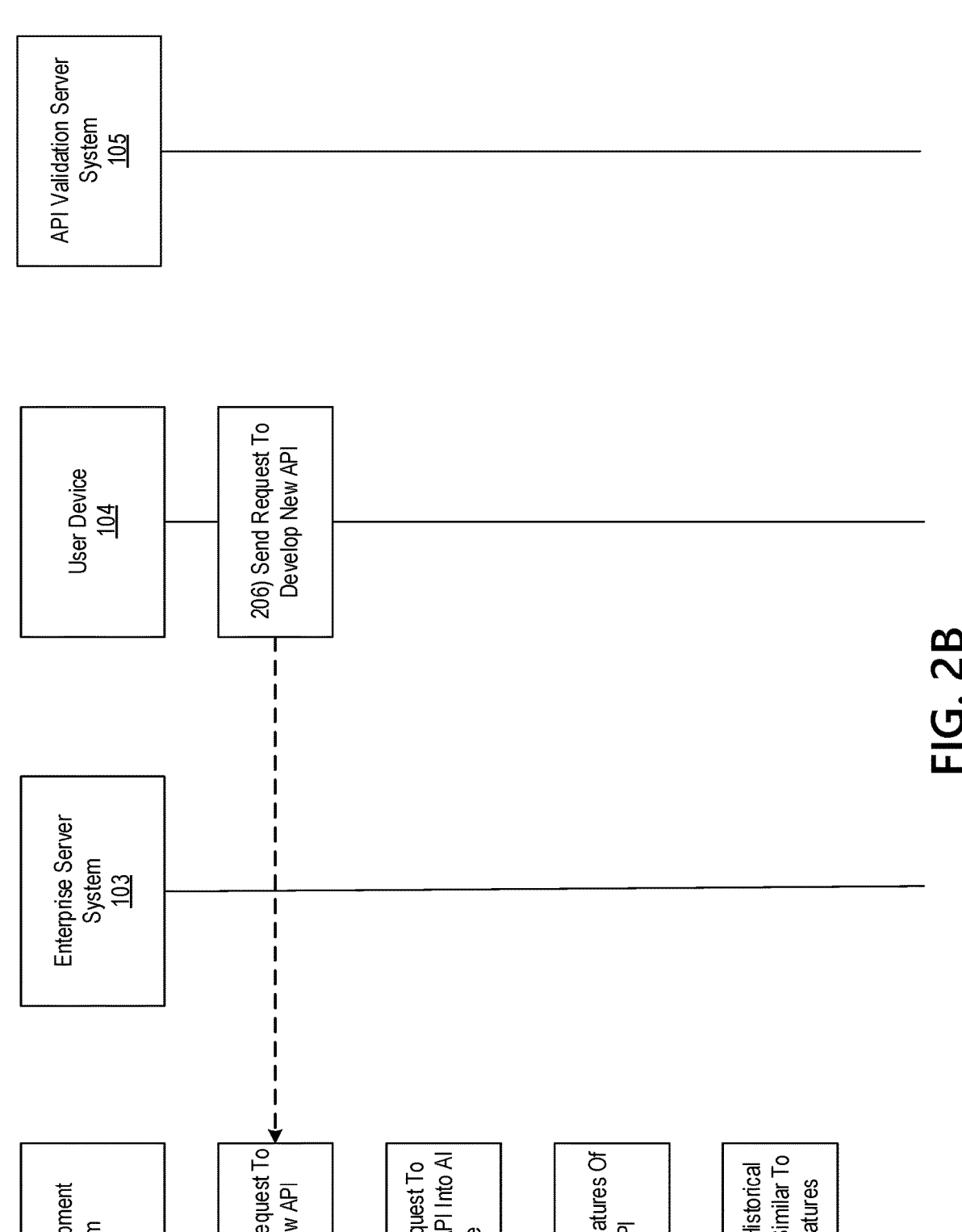

Referring to FIG. 2B, at step 206, user device 104 may send a request to develop a new API to API development platform 102. In some instances, the request may include information related to the API such as requested features for the API (e.g., an authentication protocol, a security protocol, a response time protocol, and/or other protocols/features).

At step 207, API development platform 102 may receive the request to develop the new API. For example, API development platform 102 may receive the request while the second wireless data connection is established. In some instances, API development module 112a may receive the request. Although the sending and receipt of the request and other information are described at steps 206 and 207, additional information may also be sent to and/or received by the API development platform 102 without departing from the scope of the disclosure.

At step 208, API development platform 102 may input the request to develop the new API into an AI engine (e.g., AI engine 112c). At step 209, API development platform 102 may use the AI engine to extract features of the new API. For example, the newly requested API may include one or more features, such as an authentication protocol, a security protocol, a response-time protocol, and/or other protocols/features, and the API development platform 102 may extract these features from the newly requested API.

At step 210, API development platform 102 may use the AI engine to identify historical API features similar to the new API features. For example, the new API may include a feature such as a security protocol, and there may be one or more security protocols from historical API features that may be identified by the API development platform 102. In doing so, API development platform 102 may gather historical API features and/or categorize the historical API features as being similar based on the extracting. For example, API development platform 102 may identify similar APIs by identifying other APIs with matching (or otherwise similar) features.

Figure 2C:
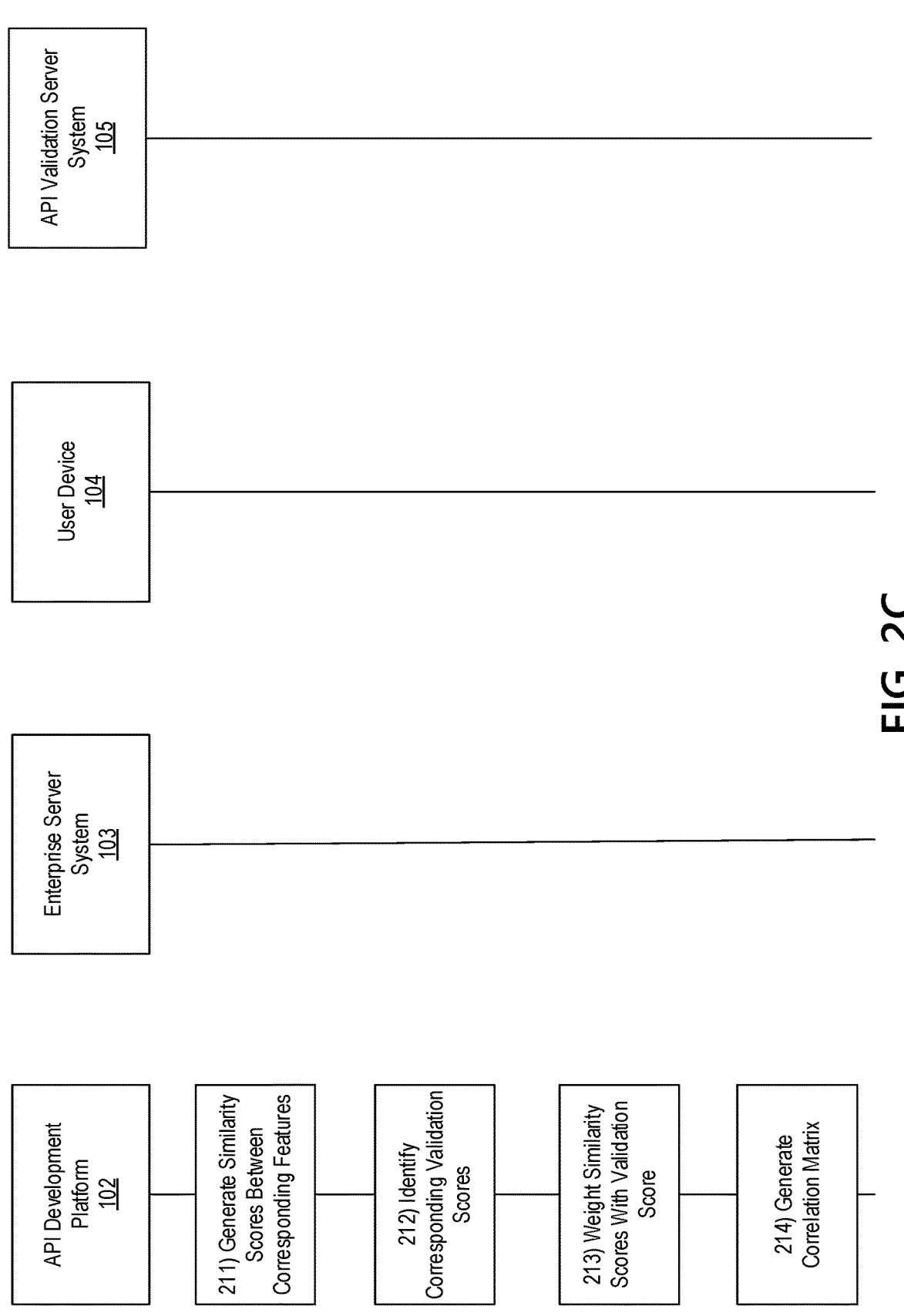

Referring to FIG. 2C, at step 211, API development platform may use the AI engine to generate similarity scores based on corresponding similar features between the new and historical API features. In some instances, a similarity score may be a numerical value between zero and one, with a zero representing no similarity between two features and a one representing two features that are the same. For example, if a requested API feature is a transport layer security (TLS) encryption protocol, and a historical API feature also is a TLS encryption protocol, then a corresponding similarity would be one. For example, if a requested API feature is a response time of 500 milliseconds, and a historical API feature has a response time of 550 milliseconds, then a corresponding similarity score may be 0.9 (representing, e.g., a 90% similarity between 550 milliseconds and 500 milliseconds based on a percent difference between the two response times). In some instances, there may be more than one historical API feature that is similar to a requested API feature, with varying corresponding similarity scores that were used as inputs during the training step 204.

At step 213, API development platform 102 may use the AI engine to weight similarity scores based on a corresponding validation score. A validation score may refer to the number of times a historical API (comprising, e.g., a set of historical API features) was validated by systems such as API development platform 102, API validation server system 105, and/or other systems. In doing so, historical API features that have been validated more (meaning i.e., more consensus between systems), may have their similarity scores weighted to a higher value, making that historical API feature more likely to be determined to be the corresponding API feature, as discussed in more detail below. In some instances, the similarity scores are already weighted by corresponding validation scores during the training step 204. For example, a similarity score may be weighted based on the number of times the corresponding API was validated (e.g., 2× weighting based on being validated by two validating systems, 3× weighting based on being validated by three validating systems, etc).

At step 214, API development platform 102 may use the AI engine to generate a correlation matrix using all the previously extracted features of the new API, the features of the similar historical APIs, and their corresponding weighted similarity scores. In some instances, the correlation matrix may look similar to correlation matrix 505. For example, correlation matrix 505 shows a matrix containing new API features (e.g., new feature 1, new feature 2, new feature 3), historical API features (e.g., historical feature A, historical feature B, historical feature C), and corresponding similarity scores between the new API features and historical API features. For example, a similarity score of 1 between new feature 1 and historical feature A may indicate a similarity of 1 (representing, e.g., 100% similarity) between the features. Although not shown, the similarity scores of correlation matrix 505 may further be weighted based on the number of times (representing, e.g., the number of validating systems) the historical APIs were validated without departing from the scope of the disclosure. Although a 3×3 grid of new API features and historical API features is shown with respect to correlation matrix 505, any number of new API features, historical API features, and corresponding similarity scores may comprise the correlation matrix without departing from the scope of the disclosure.

Figure 2D:
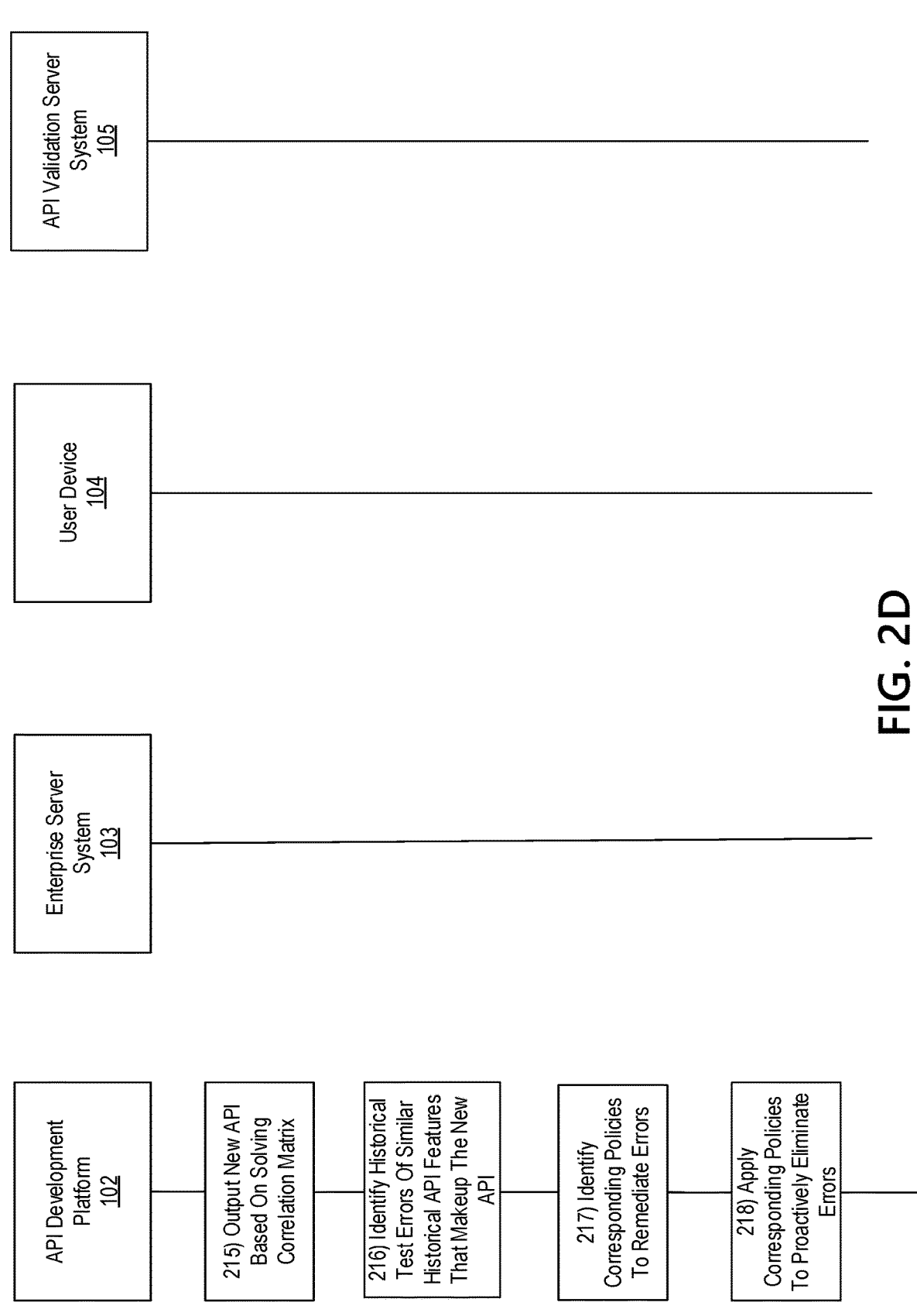

Referring to FIG. 2D, at step 215, API development platform 102 may use the AI engine to output a new API based on solving the correlation matrix. In some instances, solving the correlation matrix may involve iterating through permutations of different combinations of similar features of historical API features to solve the correlation matrix. For example, with respect to correlation matrix 505, API development platform 102 may solve correlation matrix 505 by iterating through each historical API feature (e.g., historical feature A, historical feature B, historical feature C) for a particular new API feature (e.g., new feature 1) to identify the highest similarity score (e.g., historical feature A, with a similarity score of 1).

At step 216, API development platform 102 may identify historical test errors of similar historical API features that make up the new API. For example, a historical error may be an invalid library associated with the corresponding historical API and/or historical API feature. In identifying historical APIs with similar features to the new API features, and identifying errors associated with those APIs, API development platform 102 may predict that the new API may have similar issues.

At step 217, API development platform 102 may identify corresponding policies to remediate the previously identified errors in step 217. For example, a corresponding policy of determining a valid library associated with the corresponding historical API and/or historical API feature may be identified as remediating the previously identified error. In some instances, the AI engine of API development platform 102 may have stored information relating to correlations between the errors and corresponding policies to remediate those errors.

At step 218, API development platform 102 may apply the corresponding policies to proactively eliminate the previously identified errors. For example, a corresponding policy of determining the valid library may be applied to proactively eliminate the historical error from occurring again during future testing. In some instances, steps 216-218 may be performed as part of the training step 204. Additionally or alternatively, steps 216-218 may be performed as part of the outputting step 215. In performing steps 216-218, API development platform 102 may preemptively eliminate historical errors from previous historical API tests, which may eliminate those errors from occurring during future testing performed by API development platform 102, API validation server system 105, and/or other validating systems.

Figure 2E:
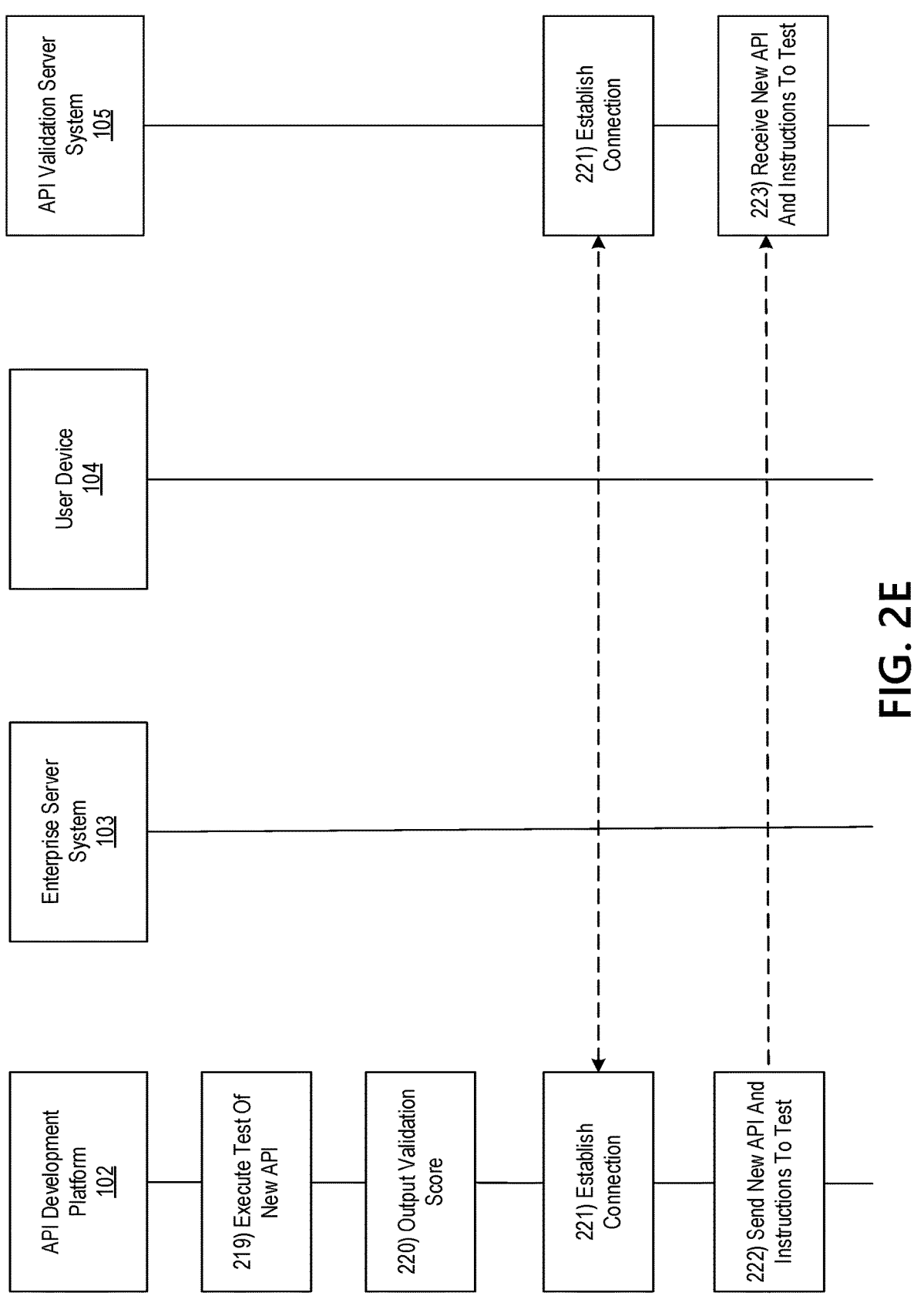

Referring to FIG. 2E, at step 219, API development platform 102 may execute a test of the new API. Based on the testing performed in step 219, at step 220, API development platform 102 may output a validation score. For example, a successful test may output a validation score of one. For example, an unsuccessful test may output a validation score of zero. If the validation score is zero, API development platform 102 may proceed back to step 215 and output a different API based on a different combination of historical API features. If the validation score is a one, API development platform 102 may proceed to step 221.

At step 221, API development platform 102 may establish a connection with API validation server system 105. For example, API development platform 102 platform 102 may establish a third connection between API development platform 102 and API validation server system to link API development platform 102 to API validation server system 105 (e.g., in preparation for sending the new API, and/or performing other functions). In some instances, API development platform 102 may identify whether or not a connection is established with API validation server system 105. If a connection is already established with API validation server system 105, API development platform 102 might not re-establish the connection. If a connection is not yet established, API development platform 102 may establish the connection as described herein.

At step 222, API development platform may send the new API and instructions to test and/or further validate the new API. At step 223, API validation server system 105 may receive the new API and instructions to test and/or further validate the new API. In some instances, API validation server system 105 may receive the new API and the instructions while the third wireless data connection is established. In some instances, the API validation module 115a may receive the request.

Figure 2F:
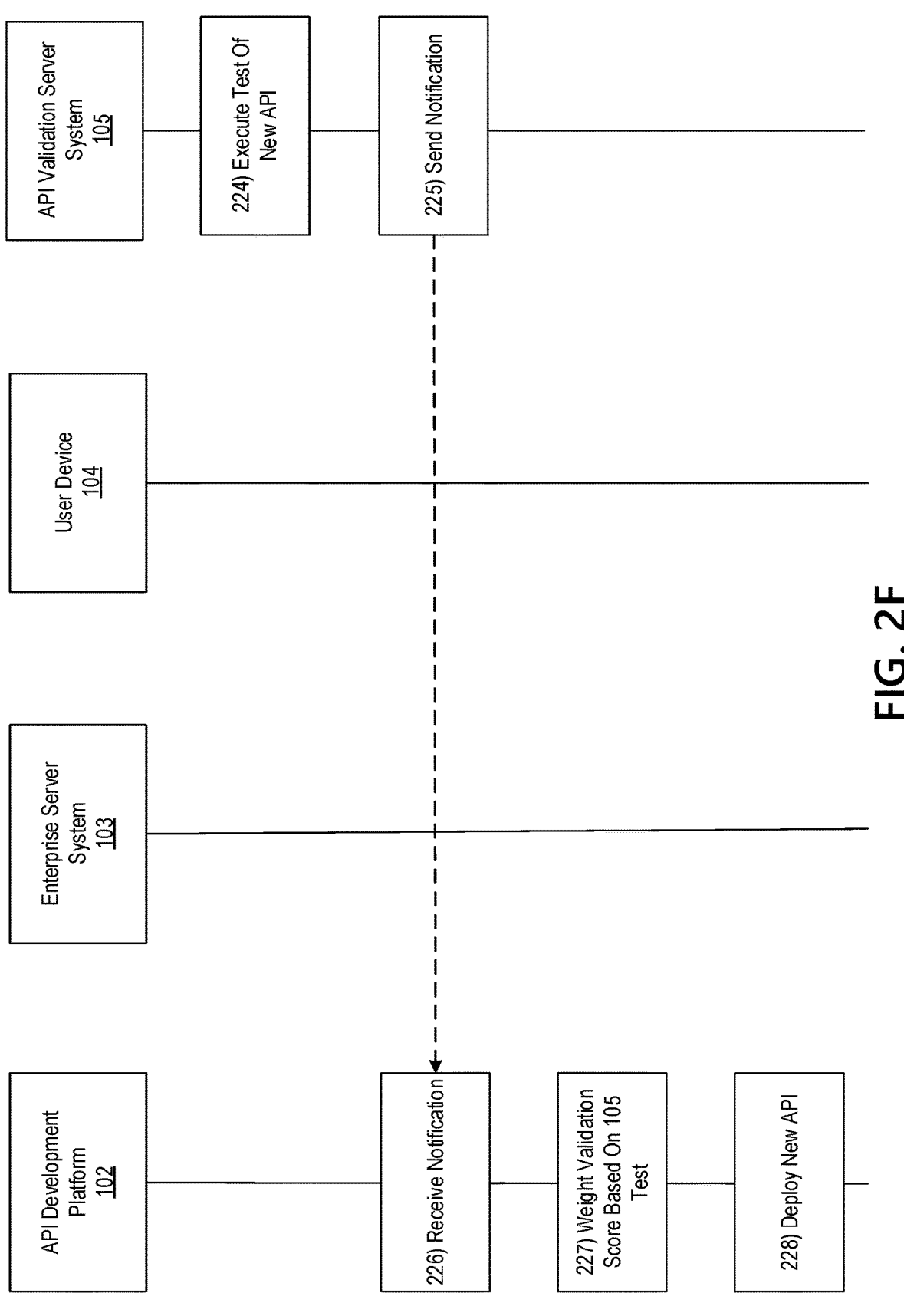

Referring to FIG. 2F, at step 224, API validation server system 105 may execute a test of the new API in order to further validate the new API. At step 225, API validation server system 105 may send a notification that the new API was validated based on the testing. If the test does not result in validating the new API, API validation server system 105 may send a notification with that information.

At step 226, API development platform 102 may receive the notification. In some instances, API development platform 102 may receive the notification while the third wireless data connection is established. In some instances, the API development module 112a may receive the notification.

At step 227, API development platform 102 may weight the validation score based on the validation performed by API validation server system 105. For example, an initial validation score of one (based on API development platform 102 testing/validating the new API), may be weighted to a validation score of two. In doing so, the new API may be further validated by API validation server system 105 and/or other validation systems. In some instances, any number of validating server systems may be used accordingly without departing from the scope of the disclosure.

At step 228, API development platform 102 may deploy the new API. In some instances, API development platform may compare the weighted validation score to a threshold before deploying the new API. For example, a threshold may be two, which may signify that the new API has been validated by two systems. In this manner, the new API may be validated by multiple validating systems in order to establish consensus that the new API is trusted to perform its functions. A network with multiple validating systems may be referred to as a tangle network, or a directed acyclic graph network.

In some instances, the new API may be deployed to the enterprise server system 103. In some instances, the new API may be sent to user device 104 to be deployed at system associated with user device 104. In some instances, the new API may be deployed at API development platform 102 and/or API validation server system 105.

Figure 2G:
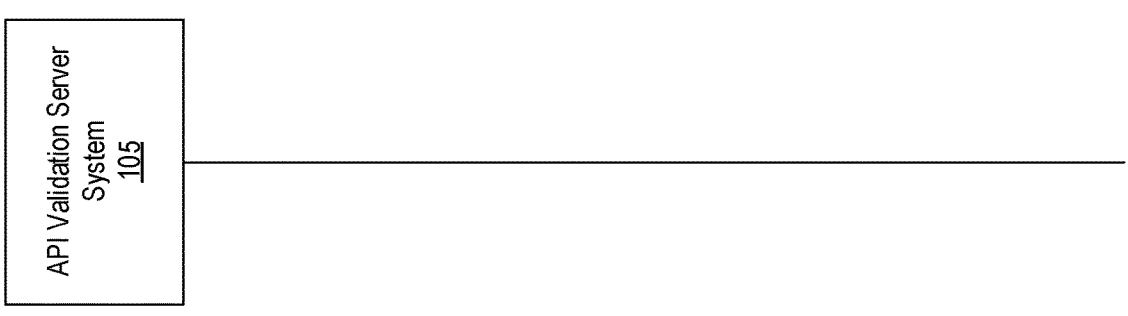

Referring to FIG. 2G, at step 229, API development platform 102 may send a notification to user device 104. At step 230, user device 104 may receive the notification. For example, user device 104 may receive the notification from API development platform 102 via the communication interface 113 and while the second wireless data connection is established. The notification may include one or more commands, that, when received by user device 104, direct user device 104 to display the notification (e.g., on a display of user device 104). In some instances, user device 104 may display a graphical user interface similar to graphical user interface 405, which is illustrated in FIG. 4. For example, the notification may include information, such as, for example, a notification that the API has been deployed and/or other information. The notification may include other information without departing from the scope of the disclosure.

At step 231, API development platform may update the AI engine. For example the AI engine may be updated based on the outputs of steps 208-220, 224, 227, and 228, and/or feedback received from user device 104 and/or enterprise server system 103. In doing so, API development platform 102 may create a feedback loop that dynamically and continuously updates and/or otherwise refines the AI engine so as to increase accuracy of the AI engine over time.

Figure 3:
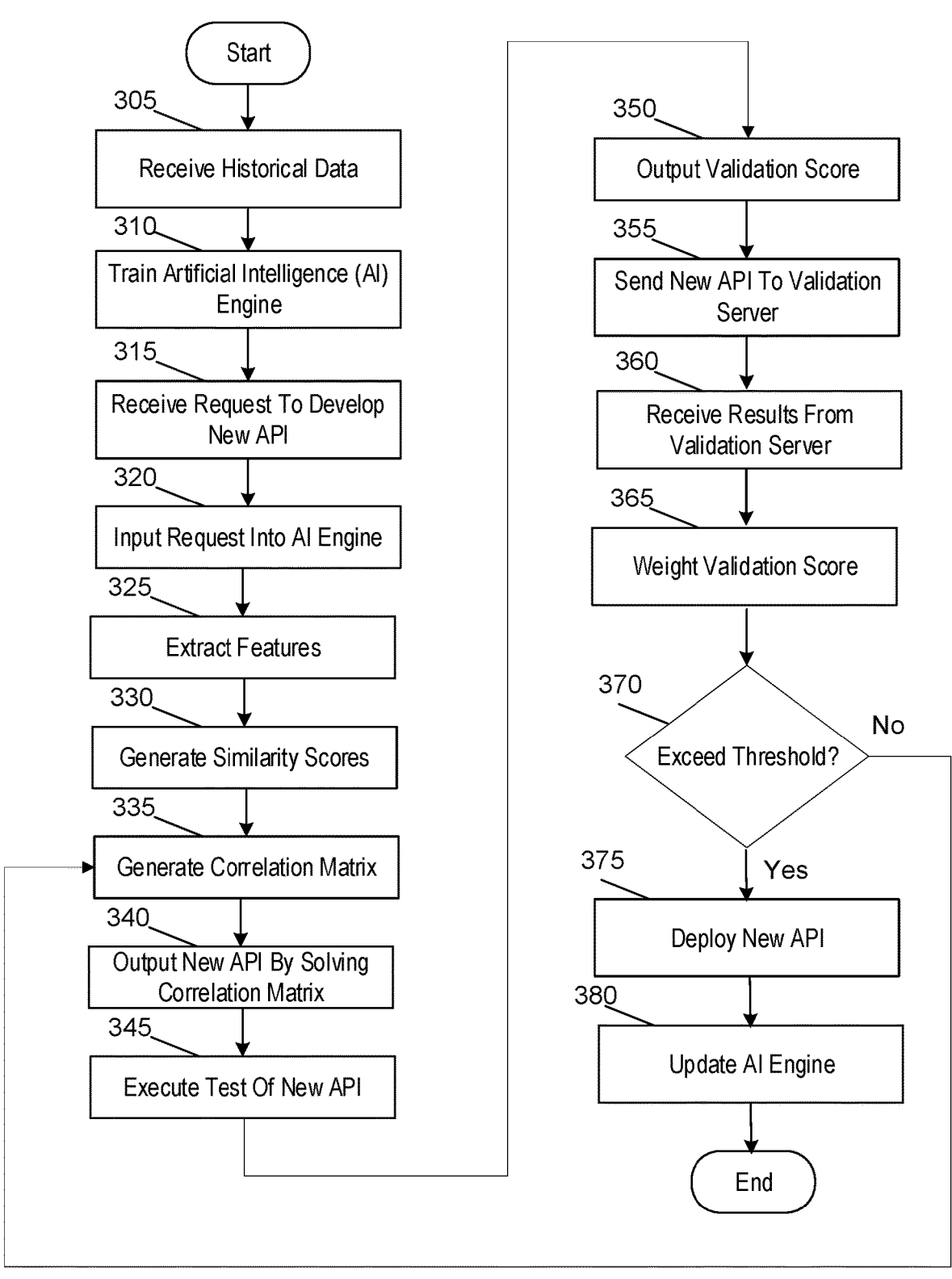
FIG. 3 depicts an illustrative method for implementing an intelligent method for efficient API development validation for a distributed programming environment leveraging tangle technology in accordance with one or more example embodiments.

FIG. 3 depicts an illustrative method for implementing an intelligent method for efficient API development validation for a distributed programming environment leveraging tangle technology in accordance with one or more example embodiments.

At step 305, a computing platform having at least one processor, a communication interface, and memory may receive historical data. At step 310, the computing platform may train an artificial intelligence (AI) engine.

At step 315, the computing platform may receive a request from user device 104 to develop a new API. At step 320, the computing platform may input the request into the AI engine. At step 325, the computing platform may extract features based on the request to develop the new API.

At step 330, the computing platform may generate similarity scores based on similarities between features of the new API and features of historical APIs. At step 335, the computing platform may generate a correlation matrix based on the similarity scores, the features of the new API, and the features of the historical APIs. At step 340, the computing system may output the new API based on solving the correlation matrix.

At step 345, the computing platform may execute a test of the new API. At step 350, the computing platform may output a validation score based on executing the test. At step 355, the computing platform may send the new API to API validation server system 105.

At step 360, the computing platform may receive results from API validation server system based on executing a similar test of the new API. At step 365, the computing platform may weight the validation score based on the results from API validation server system 105.

At step 370, the computing platform may determine whether the weighted validation score is equal to or exceeds a threshold. If the weighted validation score does need exceed a threshold, then the computing platform may proceed to step 335. If the weighted validation score is equal to or exceeds the threshold, then the computing platform may proceed to step 375.

At step 375, the computing platform may deploy the API. At step 380, the computing platform may update the AI engine.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:

at least one processor;

a communication interface communicatively coupled to the at least one processor; and memory storing computer-readable instructions that, when executed by the at least one processor, cause the computing platform to:

train, based on historical data, an artificial intelligence (AI) engine, wherein training the AI engine configures the AI engine to:

extract one or more features from a request to develop a new application programming interface (API);

generate one or more similarity scores, wherein the one or more similarity scores are based on similarities between the one or more features of the new API and one or more corresponding features of historical APIs; and output the new API based on solving a correlation matrix, wherein the correlation matrix comprises the one or more similarity scores, the one or more features of the new API, and the one or more corresponding features of the historical APIs;

receive, from a user device, a request to develop a first API;

extract, using the AI engine, one or more features of the first API;

generate, by inputting the one or more features of the first API into the AI engine, one or more first similarity scores, wherein the one or more first similarity scores indicate a numerical similarity between the one or more features of the first API and the one or more corresponding features of historical APIs;

output the first API based on solving a first correlation matrix, wherein solving the first correlation matrix is based on the one or more features of the first API, the one or more corresponding features of historical APIs, and the one or more first similarity scores;

execute a first test of the first API;

output a validation score based on the executing;

send the first API to one or more validation servers, wherein each of the validation servers are configured to execute one or more tests of the first API;

weight the validation score based on the one or more tests executed by the one or more validation servers; and deploy the first API based on the weighted validation score being equal to or exceeding a threshold.

2. The computing platform of claim 1, wherein the memory stores computer-readable instructions that, when executed by the at least one processor, further cause the computing platform to:

send, to the user device, a notification indicating that the first API was deployed and one or more commands directing the user device to display the notification, wherein sending the one or more commands directing the user device to display the notification causes the user device to display the notification.

3. The computing platform of claim 1, wherein the memory stores computer-readable instructions that, when executed by the at least one processor, further cause the computing platform to:

identify one or more historical test errors of the one or more corresponding features of the historical APIs;

identify one or more corresponding policies to remediate the one or more historical test errors; and apply the one or more corresponding policies to proactively eliminate potential future errors associated with the executing the first test.

4. The computing platform of claim 1, wherein the solving the correlation matrix further comprises iterating through the one or more corresponding features of the historical APIs to identify a highest similarity score for each one of the one or more features of the new API.

5. The computing platform of claim 1, wherein the outputting the validation score is based on successfully executing the first test and is a numerical value that corresponds to a number of successful tests by the one or more validation servers.

6. The computing platform of claim 1, wherein the training the AI engine further configures the AI engine to receive one or more historical APIs, one or more historical tests, one or more historical policies, or one or more historical weighted validation scores.

7. The computing platform of claim 1, wherein the API is deployed at an enterprise server associated with the computing platform.

8. The computing platform of claim 6, wherein the API is deployed to the user device.

9. The computing platform of claim 8, wherein the computing platform and the one or more validation servers form a directed acyclic graph network.

10. The computing platform of claim 8, wherein the memory stores computer-readable instructions that, when executed by the at least one processor, further cause the computing platform to:

update, using a dynamic feedback loop and based on the first API, the executing the first test, and the weighted validation score, the AI engine.

11. A method comprising:

training, by a computing platform, based on historical data, an artificial intelligence (AI) engine, wherein training the AI engine configures the AI engine to:

extract one or more features from a request to develop a new application programming interface (API);

generate one or more similarity scores, wherein the one or more similarity scores are based on similarities between the one or more features of the new API and one or more corresponding features of historical APIs; and output the new API based on solving a correlation matrix, wherein the correlation matrix comprises the one or more similarity scores, the one or more features of the new API, and the one or more corresponding features of the historical APIs;

receiving, by the computing platform and from a user device, a request to develop a first API;

extracting, by the computing platform and using the AI engine, one or more features of the first API;

generating, by the computing platform and by inputting the one or more features of the first API into the AI engine, one or more first similarity scores, wherein the one or more first similarity scores indicate a numerical similarity between the one or more features of the first API and the one or more corresponding features of historical APIs;

outputting, by the computing platform, the first API based on solving a first correlation matrix, wherein solving the first correlation matrix is based on the one or more features of the first API, the one or more corresponding features of historical APIs, and the one or more first similarity scores;

executing, by the computing platform, a first test of the first API;

outputting, by the computing platform, a validation score based on the executing;

sending, by the computing platform, the first API to one or more validation servers, wherein each of the validation servers are configured to execute one or more tests of the first API;

weighting, by the computing platform, the validation score based on the one or more tests executed by the one or more validation servers, and deploying, by the computing platform, the first API based on the weighted validation score being equal to or exceeding a threshold.

12. The method of claim 11, further comprising:

sending, to the user device, a notification indicating that the first API was deployed and one or more commands directing the user device to display the notification, wherein sending the one or more commands directing the user device to display the notification causes the user device to display the notification.

13. The method of claim 11 further comprising:

identifying one or more historical test errors of the one or more corresponding features of the historical APIs;

identifying one or more corresponding policies to remediate the one or more historical test errors; and applying the one or more corresponding policies to proactively eliminate potential future errors associated with the executing the first test.

14. The method of claim 11, wherein the solving the correlation matrix further comprises iterating through the one or more corresponding features of the historical APIs to identify a highest similarity score for each one of the one or more features of the new API.

15. The method of claim 11, wherein the outputting the validation score is based on successfully executing the first test and is a numerical value that corresponds to a number of successful tests by the one or more validation servers.

16. The method of claim 11, wherein the API is deployed at an enterprise server associated with the computing platform.

17. The method of claim 11, wherein the API is deployed to the user device.

18. The method of claim 11, wherein the computing platform and the one or more validation servers form a directed acyclic graph network.

19. The method of claim 11, wherein the training the AI engine further configures the AI engine to receive one or more historical APIs, one or more historical tests, one or more historical policies, or one or more weighted historical validation scores.

20. One or more non-transitory computer-readable media storing instructions that, when executed by a computing platform comprising at least one processor, a communication interface, and memory, cause the computing platform to:

train, based on historical data, an artificial intelligence (AI) engine, wherein training the AI engine configures the AI engine to:

extract one or more features from a request to develop a new application programming interface (API);

generate one or more similarity scores, wherein the one or more similarity scores are based on similarities between the one or more features of the new API and one or more corresponding features of historical APIs; and output the new API based on solving a correlation matrix, wherein the correlation matrix comprises the one or more similarity scores, the one or more features of the new API, and the one or more corresponding features of the historical APIs;

receive, from a user device, a request to develop a first API;

extract, using the AI engine, one or more features of the first API;

generate, by inputting the one or more feature of the first API into the AI engine, one or more first similarity scores, wherein the one or more first similarity scores indicate a numerical similarity between the one or more features of the first API and the one or more corresponding features of historical APIs;

output the first API based on solving a first correlation matrix, wherein solving the first correlation matrix is based on the one or more features of the first API, the one or more corresponding features of historical APIs, and the one or more first similarity scores;

execute a first test of the first API;

output a validation score based on the executing;

send the first API to one or more validation servers, wherein each of the validation servers are configured to execute one or more tests of the first API;

weight the validation score based on the one or more tests executed by the one or more validating servers; and deploy the first API based on the weighted validation score being equal to or exceeding a threshold.

* * * * *